United States Patent [19]

Hansen

[11] 4,295,761

[45] Oct. 20, 1981

[54] POST TENSIONABLE GROUTED ANCHOR ASSEMBLY

[75] Inventor: Roger M. Hansen, Birmingham, Ala.

[73] Assignee: Stratabolt Corporation, Pelham, Ala.

[21] Appl. No.: 101,723

[22] Filed: Dec. 10, 1979

[51] Int. Cl.³ .............................................. E21D 20/02
[52] U.S. Cl. .................................. 405/261; 405/259; 411/1; 411/8
[58] Field of Search ............... 405/259, 260, 261, 262; 81/61, 62, 32 R, 35

[56] References Cited

U.S. PATENT DOCUMENTS

| | | | |
|---|---|---|---|
| 3,357,730 | 12/1967 | Siler | 85/61 X |
| 3,877,235 | 4/1975 | Hill | 405/261 |
| 3,979,918 | 9/1976 | Vidler | 405/261 |
| 4,122,681 | 10/1978 | Vass et al. | 405/261 |

*Primary Examiner*—Dennis L. Taylor

*Attorney, Agent, or Firm*—Mason, Fenwick & Lawrence

[57] ABSTRACT

A resin or grout anchored rock or mine roof nut and anchor assembly including an elongated cylindrical anchor to be inserted in a bore hole in assembled relation with a nut after insertion of a destructible adhesive resin or grout containing cartridge. The anchor includes an elongated threaded rod to be received in threaded portions of the nut and the nut includes a frangible disc normally held by crimped lip portions forming a stop wall to stop rotation of the nut relative to the anchor when the nut and anchor are assembled at a first relative axial position and operative when the anchor is restrained against rotation in the bore hole by setting of the adhesive resin and torque above a selected threshold is applied to the nut to dilate the crimping and expel the disc to accommodate further threaded insertion of the nut onto the anchor.

9 Claims, 4 Drawing Figures

U.S. Patent  Oct. 20, 1981  4,295,761
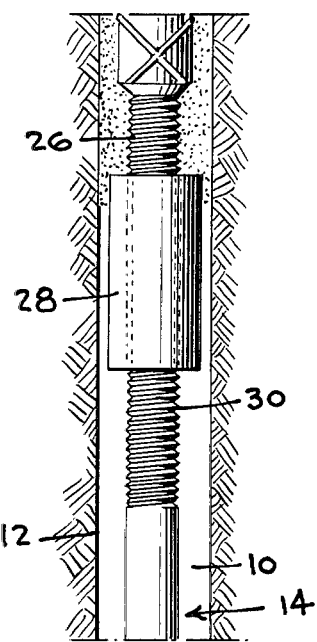
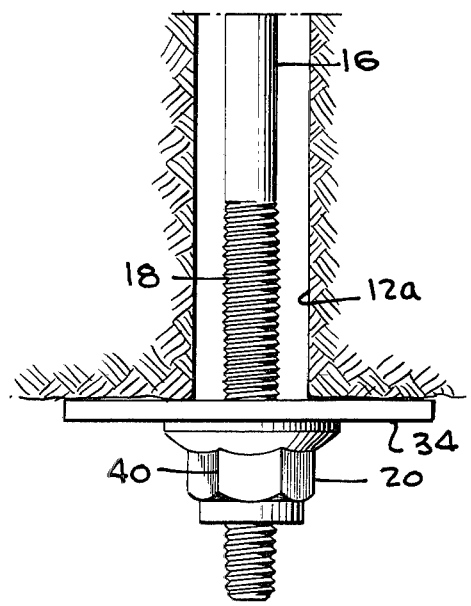
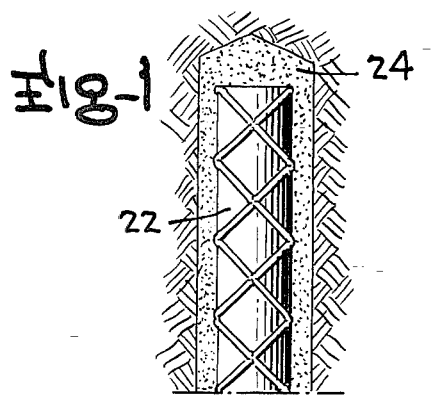
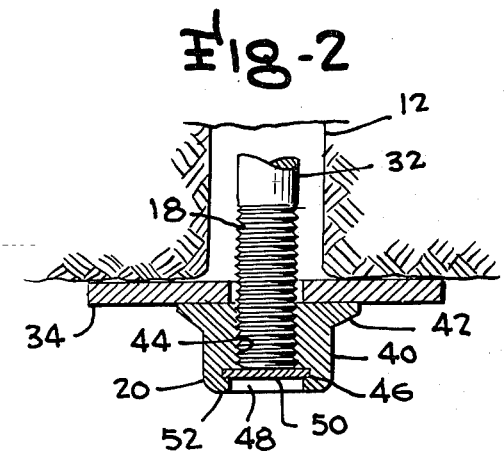
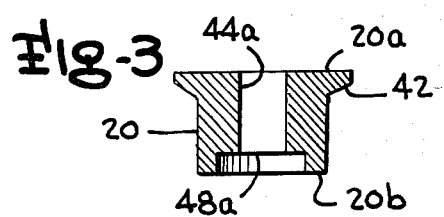
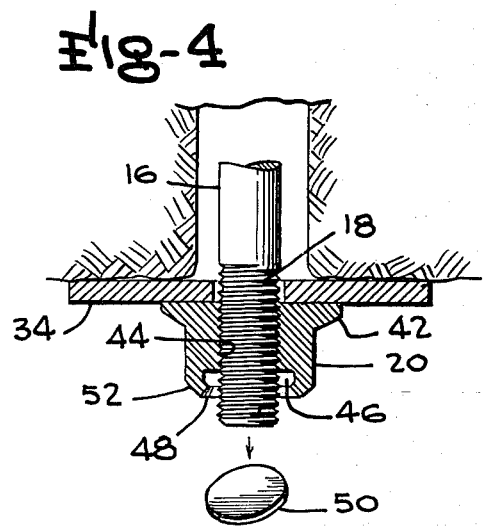

POST TENSIONABLE GROUTED ANCHOR ASSEMBLY

BACKGROUND AND OBJECTS OF THE INVENTION

The present invention relates in general to grouted pull-up mine roof or rock bolt anchor mechanisms of the post tensionable type, and more particularly to mine roof or rock bolt anchor mechanisms of the grouted or resin anchored type adapted to be introduced into a bore hole and having an anchor portion adapted to be anchored in the bore hole by a quick-setting grouting or adhesive composition and having a threaded bolt shank portion projecting externally from the bore hole about which a bearing plate and internally threaded nut may be assembled to draw the plate and nut upwardly to achieve desired compression force in the rock mass and which gives visual indication of the proper or improper relationship of the components.

In the past, two principal approaches have been used in providing anchor bolts for strengthening roofs in a coal mine, a subway tunnel or similar subterranean structures or to strengthen a rock mass. One type of construction employed parts that are expanded upon insertion within a drill or bore hole to provide a mechanical type of expansion gripping action, permitting a bolt or screw to be tightened upwardly against a face of the rock structure to achieve strengthening of the rock mass. The bolting assembly was required to enable a tension pull-up or tightening down of the bolt and bearing plate assembly in compliance with Bureau of Mines Standards established for the industry, including requirements that such an anchor bolt unit be capable of achieving installed bolt tensions within the range of at least 6,000 to 8,000 pounds.

A more recent type of assembly involves the use of adhesive or grouting material within the bore hole or drill hole for securing the rod or bolt in place, and if pull-up tensionsing was required, the outer end of the rod or bolt was threaded and provided with a nut and faceplate washer, permitting the plate to be pulled up against the front face of the rock mass or mine roof when the nut was tightened.

The mechanical type of anchor bolt described above has been somewhat limited in regard to the conditions under which it can be used, as it requires a relatively strong or more stable type of stratum and has not proven satisfactory for many types of formations encountered, particularly where mudstone or siltstone, limestone and laminated sandstone or shale formations occur. The second or adhesive type of anchor bolt unit has the advantage that the adhesive may be employed to strengthen the particular rock formation as well as secure the bolt in position in the bore hole, but such an adhesive type unit involving fast setting resin adhesives has been very expensive and has required great amounts of adhesive when applied in accordance with the customary practice of substantially filling the hole about the full length of the rod of bolt member.

There has been a general recognition of the need for improved types of bolting assemblies which will make possible the achievement of greater amounts of face compression and draw up tension strength, and which will also reduce expense from the standpoint of installation time and labor and materials.

In an effort to provide a bolting unit of the resin type which would achieve improved compression strength and draw up tension strength, and seek to reduce expense of material and labor and time involved in installation, a type of resin anchored bolt assembly has been proposed in earlier U.S. Pat. No. 3,877,235 wherein a threaded anchor unit was provided with a hollow cylindrical leading portion resembling a pipe-like shell, which was assembled to an anchor bolt and provided with a restraining device that permitted the threaded leading end cylindrical anchor portion to rotate with the anchor bolt, without relative rotation between them, whereby the shell-like anchor portion may be inserted into the bore hole behind a capsule or cartridge of adhesive resin and employed to crush and mix the resin, whereby, when the resin has cured to adhesively secure the anchor portion in the bore hole, application of a predetermined amount of torque to the bolt cause the restraining device to release the bolt for rotation relative to the anchor device and tighten it to generate compressive force in the rock mass. This was achieved by providing a fracturable disc member forming a bottom wall of the pipe-like hollow cylindrical anchor portion to which a standard nut was welded, so that when the anchor portion was held by the resin against further rotation in the bore hole, sufficient torque could be applied to the bolt to fracture and penetrate the frangible disc and allow the bolt upon tightening to be drawn up into the bore hole to produce the desired compressive force effects.

Later U.S. Pat. No. 4,051,683 discloses another type of resin anchored bolt assembly wherein a threaded anchor unit including a reinforcing rod and a threaded cylindrical collar or coupling member is provided with a transversely extending shear pin forming a stop restraining advancement of the bolt into the collar or coupling member until the resin cartridge is broken and the resin adhesive sets sufficiently to securely fix the reinforcing rod and collar or coupling member against rotation in the bore hole, whereupon advancement of the bolt shears the pin so that a threaded end portion of the bolt extending into the collar or coupling member can thread upwardly into the collar or coupling member for a limited distance. Both of these prior resin type anchors require special construction of the anchor portion to provide the frangible disc or to provide the coupling and shear pin structure, entailing added manufacturing costs.

U.S. Pat. No. 4,023,373 shows another resin anchored bolt assembly using a stop nut with thin wall fingers engaging the bolt threads to restrain the anchor member against relative rotation on the bolt until the resin sets, whereupon further rotation of the bolt with sufficient torque will cause the stop nut to "shear or strip over thread stop 20 and slide down the smooth bolt stem portion 16 thereby releasing the stop means".

A further U.S. Pat. No. 3,979,918 discloses a grouted mine roof or rock bolt anchoring assembly which may be tensioned after installation of the anchor portion within the bore hole and setting of the grouting or resin adhesive, simply by threading an internally threaded nut member onto externally projecting external thread portions of a rod extending from and forming part of the anchor assembly, but wherein the externally threaded end portion of the rod simply extends through and projects beyond the lower end of the nut as the nut is threaded tightly up against the rock face surrounding the entrance to the bore hole.

An object of the present invention is the provision of an improved mine roof or rock bolt grouted anchor assembly of the post tensionable type, wherein an externally threaded rod member extending from the anchor portion to be anchored by the grouting or resin material in the bore hole projects to an exposed position beyond the bore hole entrance, and bearing plate means and an internally threaded nut is assembled onto the threaded end of the anchor rod portion and includes a frangible disc incorporated therein which is forced out during tightening of the nut to proper tensioning position on the anchor rod portion.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is a vertical section view in elevation showing the complete grouted anchor system of the present invention installed in a bore hole after mixing and setting of the grouting or resin adhesive surrounding the upper anchor portion;

FIG. 2 is a fragmentary vertical section view showing the novel frangible disc nut assembled onto the threaded rod portion of the anchor in appropriate position to receive a rotating tool for driving the anchor assembly to mix the grouting or resin preparatory to curing or setting of the grouting or adhesive in the bore hole;

FIG. 3 is a vertical section view through the special blank from which the nut is fabricated; and FIG. 4 is a fragmentary vertical section view along a plane similar to FIG. 2, but showing the nut tightened to the desired post tensioned condition and the frangible disc exploded away by dilation of the nut.

DETAILED DESCRIPTION OF A PREFERRED EMBODIMENT

Referring to the drawings, wherein like reference characters designate corresponding parts throughout the several figures, the post tentionable grouted anchor system of the present invention is indicated generally by the reference character 10, and is illustrated in FIG. 1, in installed condition in a bore hole formed in a mine roof ceiling or rock formation. The bore hole, indicated generally by the reference character 12, is conventionally formed by drilling into the mine roof or rock formation, usually to depths of about 2 to 5 feet, but in some cases to as much as 10 or 12 feet. The anchor portion of the assembly, indicated generally by the reference character 14, comprises essentially an elongated rod 16 threaded at its lower end, as indicated at 18, which projects through the lower entrance end of the bore hole 12 in the installed condition so as to permit it to be assembled with an internally threaded nut member 20. The anchor portion 14 may have any of a number of different appropriate configurations in its upper portion disposed in the portions of the bore hole opposite or remote from the entrance end. For example, the anchor portion may be generally described as an upper hollow pipe or shell cylindrical anchor member, formed from an inexpensive piece of hollow material such as ordinary steel pipe, or may formed of a length of conventional surface deformed steel reinforcing rod or rebar of the type used for reinforced concrete construction and the like. In either of these forms, the pipe shell or rebar may extend the full length of the hole and its lower end portion will be formed into the shape of an elongated anchor rod of smaller diameter having male threads or an external thread portion as indicated generally at 18 in the portion thereof which projects outwardly through the entrance end 12a of the bore hole 12.

In the preferred embodiment illustrated in the drawings, the anchor portion 14 may take the form of a steel concrete reinforcing rod 22 of a predetermined length, which is fabricated long enough to properly bond in the grout material, such as resinous or cementicious compounds commonly used for anchor grouts, indicated generally at 24 in FIG. 1, which is machined to form a threaded rod portion 26 extending axially from the lower end thereof for a short length, or may have welded thereto a threaded rod portion like the portion 26. This threaded portion 26 is assembled to an internally threaded coupling sleeve 28, which is also assembled to the externally threaded upper end portion 30 of the elongated rod 32, the lower end of which is also externally threaded to provide the male threads 18. When the coupling sleeve 28 is used, this serves the additional function of helping to retain the grout material in the bore hole during mixing, by making the clearance between the outer surface of the coupling sleeve 28 and the inside of the bore hole 12 great enough to allow for free insertion but small enough to impede the downward flow of the grout material.

In its application, the internally threaded nut member 20 is constructed in a manner to temporarily prevent rotation relative to the mating threads 18 on the elongated rod member 16 of the anchor portion 14. The grout material, such as resinous cementicious compounds of the type commonly used for anchor grouts, although any material having appropriate adhesive properties could be used, is normally packaged in a destructable cartridge, frequently having two or more compartments with the various compounds which will make up the grout itself. The cartridge, such for example as the cartridge 30 having compartments in the areas indicated at 31 and 32 in the Hill U.S. Pat. No. 3,877,235, is inserted into the bore hole 12 and forced to the back of the hole by inserting the anchor assembly. The uppermost end portion of the anchor assembly, for example the concrete reinforcing rod portion 22, is further forced through the cartridge rupturing the casing, until it is fully inserted in the hole. After insertion, the anchor assembly is rapidly rotated by an appropriate tool, such as a motor driven socket tool or tightening dolly associated with a bolting machine, as described, for example, in Vidler U.S. Pat. No. 3,979,918, which is coupled to the internally threaded nut member 20, for example by fitting a hexagonal socket at an end of the working shaft or tool end of the driving machine over the hexagonal portion of the internally threaded nut member 20. This rotation is continued until the grout material has been mixed adequately, whereupon the anchor assembly is held stationary until the grout hardens sufficiently to withstand a substantial force tending to withdraw the anchor assembly from the hole. The grout material will, as indicated at 24 in FIG. 1, ordinarily surround the reinforcing rod portion 22 or the upper end portion over the major length of the anchor portion 14, occupying the space between, in the illustrated example, the reinforcing rod portion 22 and the bore hole in the zone above the coupling sleeve 28.

After the grout material has hardened sufficiently to withstand withdrawal of the anchor assembly from the hole with the desired restraining force, a rotational force is then applied to the internally threaded nut member 20. Since the reinforcing rod portion 22 and portions coupled to the elongated anchor rod portion 32 are held in place by the grout material and resist further movement, when the rotational force applied to the nut member 20 exceeds the resistance to relative motion between the nut member 20 and the rod 16, by structure hereinafter described, the internally threaded nut member 20 advances onto the elongated anchor rod member 16 and can be tightened against the rock thereby pre-stressing the anchor and imparting a high beneficial compressive stress within the rock mass. Optionally, the system may also include a bearing plate 34 or large washer which may be assembled onto the threaded portion of the elongated anchor rod 16 between the nut 20 and the rock, so as to be drawn against the face of the rock bounding the entrance 12a to the bore hole and distribute the contact forces at the exposed rock face. If desired, the bond between the anchor rod and grout may be enhanced by deforming the upper end of the rod, if only an elongated rod 16 having threads 18 is provided without having the coupling sleeve and reinforcing rod portions described in the illustrated preferred embodiment.

A preferred embodiment for the internally threaded nut member 20 is illustrated in greater detail in FIGS. 2, 3 and 4, wherein the nut member includes a nut-like external surface configuration, such as a square or hexagonal shape, as indicated at 40 and an outwardly flaring flange or rim portion 42 may be optionally provided to bear against the bearing plate or large washer 34. The nut member 20 includes an internally threaded central bore 44 extending through the major portion of the length of the nut member 20 from the upper or bearing face 20a thereof toward the lower end portion 20b to mate with the externally threaded male threads 18 on the rod portion 16, and communicates with a frangible disc receiving cavity portion 46 and a larger diameter lower exit end bore portion 48 as shown. The nut member 20 is preferably fabricated from a special blank as shown in FIG. 3, which has a relatively smaller diameter cylindrical bore 44a extending through the major portion thereof from the larger diameter end face 20a and communicates with an enlarged diameter cavity 48a opening through the lower end 20b of large enough diameter to accept the frangible disc member 50. The frangible disc member 50 is a thin cylindrical disc designed to be normally retained in the cavity 46, to form a stop which engages the lower or exterior end of the anchor portion rod member 16 and limit movement of the threaded portion 18 through the threaded bore 44 of the nut to prevent the threaded rod 16 from passing completely through the nut 20. The cavity 48a in the nut member 20 is larger in diameter than the externally threaded rod member 16 and deeper than the thickness of the frangible disc 50. The edges of the cavity 48a are thin enough to be easily crimped over the perimeter of the frangible disc 50 so as to retain the disc assembled in the nut member 20 in the position shown in FIG. 2.

In application, the grout material in the cartridge inserted into the bore hole 12 prior to insertion of the anchor assembly is mixed by rupturing the casing of the cartridge holding the ingredients of the grout material and rapidly rotating the anchor assembly with an appropriate device that grips the nut member 20. When the grout material has hardened sufficiently to withstand a substantial force tending to withdraw the anchor assembly from the hole, to an extent well understood in the art, rotational force is again applied to the nut member 20. Because the anchor portion 14 can no longer rotate in the bore hole because of the restraint of the hardened grout material 24, the threaded rod 16 exerts an outward or downward force against the frangible disc 50 upon attempted continued rotation of the nut member 20 from the FIG. 2 position, causing the crimped portions 52 of the nut surrounding the disc retaining cavity 46 and bounding the perimeter of the cavity, as indicated in FIGS. 2 and 4, to dilate as shown in FIG. 4 and release the disc 50 from the nut member, allowing further passage of the threaded portion 18 of the elongated rod 16 through the nut member. The nut member 20, therefore, is then free to rotate and properly post tension the anchor system to permit the nut member and bearing plate or washer to be tightened against the rock to the desired prestressing condition.

The herein described system provides significant advantage over prior systems such as those disclosed in the above identified patents. Many of the prior art systems have experienced intermittent field problems when used with polymer type grouts. In these applications, excessive rotation of the anchor to mix the grout can result in a high buildup of resistance to rotation by the grout. If the means to prevent relative rotation between the threaded members of the anchor system is not able to withstand the increasing torque, a tension force builds up against the still soft grout. This causes the anchor member to pull out of the grout and either damage the strength of the polymer molecules forming within the grout or to reduce the bond between the grout and the bore hole wall. If rotation of the bolt head is stopped for a short period and subsequently resumed, the bolt appears to tighten normally without any indication that the anchorage has been weakened. However, the potential resistance to movement within the rock mass is severly reduced and failures can result.

The present invention described herein provides a visual indication that the grout mixing procedure is improper if such improper conditions during the installation and mixing procedure have occurred. In cases such as described above, the application of high tightening forces causes the anchorage to yield excessively and allows downward movement of the threaded rod which can be readily observed by the extent of projection of the threaded rod beyond the lower end of the nut member when tightened to its final position. This is because an excessive amount of rotation is then allowed between the externally and internally threaded members, such that a considerable length of the threaded rod will protrude from the assembly. Since the properly assembled and installed system is very rigid, normally only a few threads will protrude. Where the grout strength is impaired by overmixing, from one to three inches of threads will be exposed, thus providing an obvious visual warning of potential problems.

I claim:

1. A post tensionable rock and mine roof anchor and nut assembly of the grouted or resin anchored type to be installed in a bore hole in a mine roof rock formation or the like and tensioned after mixing and setting of the grouting or resin for strengthening the same, comprising an elongated anchor including a generally cylindrical portion at its upper end having a shorter length than the depth of the bore hole in which it is to be fitted and having an elongated externally threaded rod portion at its lower end adapted to project a predetermined short distance externally of the bore hole when the anchor is normally positioned in substantially fully inserted condition in the bore hole, an internally threaded nut member to threadably receive the threaded rod portion therein providing companion thread surfaces forming a screw thread coupling assembling said nut member and anchor together and said nut member having an end surface to exert bearing force against the face of the rock formation, the anchor being adapted to be introduced into the bore hole in assembled relation with the nut member after insertion of a destructible cartridge containing quick-setting adhesive resin or grouting material therein to crush the cartridge and mix and distribute the resin or grouting material throughout the space outwardly surrounding most of the anchor and fixing the anchor in the bore hole upon hardening of such material thereabout, the nut member having a bore therethrough including a first smaller diameter bore portion extending from said end surface through a major portion of the axial depth of the nut member threaded to mate with the threads of the external threaded rod portion and having a second enlarged diameter bore portion forming the exit end of the bore communicating with the first bore portion, a disc seated in the second bore portion, and inwardly crimped lip formations integral with the nut surrounding the exit end of the bore and inwardly lapping the periphery of the disc in said second bore portion to retain the disc therein in position to bar penetration of the anchor rod portion through the nut until a predetermined torque force level is exceeded, the nut member being initially assembled in threaded relation with the threaded rod portion of the anchor to occupy an initial assembled position wherein the disc restrains relative rotation of the nut member with respect to the anchor until said predetermined torque force level is exceeded, and said crimped lip formations releasing the disc and accommodating further threaded insertion of the rod portion through the bore of the nut when the anchor is restrained against rotation by setting of the adhesive resin or grouting material and torque force in excess of the predetermined torque force level is applied to the nut member.

2. A post tensionable rock and mine roof anchor and nut assembly of the resin anchored type, as defined in claim 1, wherein said anchor is an elongated, generally cylindrical section of steel reinforcing rod of the type used for reinforced concrete construction and the like having conventional longitudinal and transverse protruding surface deformations along the exterior surface thereof, and the reinforcing rod having a smaller diameter elongated rod connected to the end of the reinforcing rod section forming the lower end portion of the anchor.

3. A post tensionable rock and mine roof anchor and nut assembly as defined in claim 2, wherein said rod portion is an elongated rod having upper and lower external male threads along opposite end portions thereof, the lower threads providing the threaded rod portion on which said nut member is assembled, and an internally threaded coupling sleeve threaded onto said upper threads and threadedly coupled to said reinforcing rod connecting said reinforcing rod and threaded rod portion.

4. A post tensionable rock and mine roof anchor and nut assembly as defined in claim 2, wherein said rod portion is an elongated rod having upper and lower external male threads along opposite end portions thereof, the lower threads providing the threaded rod portion on which said nut member is assembled, and an internally threaded coupling sleeve having an outer diameter closely approaching the diameter of the bore hole threaded onto said upper threads and threadedly coupled to said reinforcing rod connecting said reinforcing rod and threaded rod portion.

5. A post tensionable rock and mine roof anchor and nut assembly as defined in claim 1, wherein said rod portion is an elongated rod having upper and lower external male threads along opposite end portions thereof, the lower threads providing the threaded rod portion on which said nut member is assembled, and internally threaded coupling means connecting said cylindrical portion and threaded rod portion.

6. A post tensionable rock and mine roof anchor and nut assembly as defined in claim 1, wherein said nut member has a non-round regular polygon external configuration over its lowermost end portion to be received in driven relation in a socket of a rotary drive tool and having an enlarged diameter rim formation bounding said end surface thereof providing an enlarged annular surface to confront the face of the rock formation.

7. A post tentionable rock and mine roof anchor and nut assembly as defined in claim 2, wherein said nut member has a non-round regular polygon external configuration over its lowermost end portion to be received in driven relation in a socket of a rotary drive tool and having an enlarged diameter rim formation bounding said end surface thereof providing an enlarged annular surface to confront the face of the rock formation.

8. A post tentionable rock and mine roof anchor and nut assembly as defined in claim 4, wherein said nut member has a non-round regular polygon external configuration over its lowermost end portion to be received in driven relation in a socket of a rotary drive tool and having an enlarged diameter rim formation bounding said end surface thereof providing an enlarged annular surface to confront the face of the rock formation.

9. A post tentionable rock and mine roof anchor and nut assembly as defined in claim 5, wherein said nut member has a non-round regular polygon external configuration over its lowermost end portion to be received in driven relation in a socket of a rotary drive tool and having an enlarged diameter rim formation bounding said end surface thereof providing an enlarged annular surface to confront the face of the rock formation.

* * * * *